US012737060B1

(12) United States Patent
Lim

(10) Patent No.: US 12,737,060 B1
(45) Date of Patent: Sep. 15, 2026

(54) FIXED PATTERN NOISE SUPPRESSION IN OPTICAL MOUSE BY REGULATING ESTIMATOR UPDATES

(71) Applicant: PixArt Imaging Inc., Hsin-Chu City (TW)

(72) Inventor: Kevin Len-Li Lim, Penang (MY)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 19/207,337

(22) Filed: May 13, 2025

(51) Int. Cl.
*G06F 3/038* (2013.01)
*G06F 3/0354* (2013.01)
*G06T 5/50* (2006.01)
*G06T 5/70* (2024.01)

(52) U.S. Cl.
CPC .......... *G06F 3/038* (2013.01); *G06F 3/03543* (2013.01); *G06T 5/50* (2013.01); *G06T 5/70* (2024.01); *G06T 2207/20182* (2013.01); *G06T 2207/20216* (2013.01); *G06T 2207/20224* (2013.01)

(58) Field of Classification Search
CPC ..... G06F 3/03543; G06F 1/3259; G06F 3/038
USPC .......................................................... 348/135
See application file for complete search history.

(56) References Cited

U.S. PATENT DOCUMENTS

2006/0044267 A1* 3/2006 Xie ..................... G06F 3/03543 345/157
2007/0103441 A1* 5/2007 Kong .................... G06F 3/0421 345/166
2023/0179882 A1* 6/2023 Lee ....................... G06F 3/0354 348/135

* cited by examiner

*Primary Examiner* — Kevin M Nguyen
(74) *Attorney, Agent, or Firm* — Winston Hsu

(57) ABSTRACT

A method for performing fixed-pattern noise (FPN) estimation in an optical mouse includes: capturing a series of images to generate a plurality of frames; accumulating motion of the optical mouse to generate an accumulated distance; comparing the accumulated distance to a threshold; when the accumulated distance is greater than the threshold, enabling FPN estimation of the plurality of frames; and resetting the accumulated distance to zero.

18 Claims, 5 Drawing Sheets

FIXED PATTERN NOISE SUPPRESSION IN OPTICAL MOUSE BY REGULATING ESTIMATOR UPDATES

BACKGROUND OF THE INVENTION

1. Field of the Invention

The invention is directed to FPN (fixed pattern noise) suppression, and more particularly, to a method and device which can regulate FPN estimator updates to improve FPN suppression.

2. Description of the Prior Art

An optical mouse contains a sensor which captures a series of images that are then compared. By correlating two images, offset in both the x and y axes can be calculated and used to align features in the two images for determining motion of the mouse.

The images will contain features captured by the mouse sensor as the mouse moves, and will also contain a certain amount of noise. This noise can be divided into temporal noise and fixed-pattern noise, wherein temporal noise (TN) will change over time, but fixed-pattern noise (FPN) has a largely consistent and unchanging pattern over time. FPN may be due to irregularities/small differences in specific sensor pixels, resulting in certain pixels at fixed locations being brighter than others.

Strong FPN can be hard to differentiate from features in the images generated by the optical sensor. This makes it difficult to determine whether the mouse is actually moving, as motion is determined by comparing differences in features. Further, the FPN will not significantly change between frames, as a mouse sensor typically captures small motion.

By calculating and then suppressing the FPN within captured images, accuracy of the optical mouse can be improved. A related art method achieves this by estimating the FPN and then subtracting it from the captured images. Refer to FIG. 1, which is a diagram of components within an optical mouse 100, comprising a pixel array 110, an image filter 120, a subtract circuit 130 and an FPN estimator 140. The pixel array 110 generates a raw image I_x, which is passed to the image filter 120 for generating a filtered image F_x. This is input to the FPN estimator 140, which outputs an estimate N_x that is subtracted from the filtered image by the subtract circuit 130 to generate a signal G_x (wherein G_x=F_x−N_x). The motion of the mouse 100 is determined by correlating a series of G_x images.

In the above method, historical filtered images F_x are usually averaged while the mouse is still in motion so that features over a single pixel location are not frequently sampled. As the FPN occurs due to small differences in specific pixels, sampling over different pixels will give a better result. The real-time FPN estimation requires an online averaging approach such as exponential averaging.

An example of the real-time FPN estimation is demonstrated by the following equation:

$$N\_X = K*F\_x + (K-1)*N\_x'$$

wherein N_x' is the value of N_x of a previous frame, and K is a constant which is typically 1/32.

This method is less effective, however, when the mouse is stationary or moving very slowly. As the update to the FPN estimate N_x occurs every frame, N_x will incorporate features captured by the optical image sensor as well as noise. This means that N_x will increasingly start to resemble F_x with each subsequent update. As G_x=F_x−N_x, it will gradually become impossible for a correlator of the mouse to distinguish between two images.

As an example, when a series of images captured by the optical mouse 100 comprise strong FPN and a strong feature which crosses over a pixel of interest (POI), the strong feature will be partially incorporated into N_x when the optical mouse 100 is moving slowly and N_x is updated every frame. This results in over-subtraction of the FPN when N_x is subtracted from the filtered image F_x, which diminishes as the feature moves away from the POI, and presents as a streak or trail around the POI co-ordinate.

Performing accurate FPN estimation and suppression when a mouse is stationary or moving slowly is therefore an issue still to be solved.

SUMMARY OF THE INVENTION

A method for performing fixed-pattern noise (FPN) estimation in an optical mouse comprises: capturing a series of images to generate a plurality of frames; accumulating motion of the optical mouse to generate an accumulated distance; comparing the accumulated distance to a threshold; when the accumulated distance is greater than the threshold, enabling FPN estimation of the plurality of frames; and resetting the accumulated distance to zero.

An optical mouse, configured to perform fixed-pattern noise (FPN) estimation comprises: a pixel array circuit, configured to generate a plurality of frames corresponding to a series of images captured by the optical mouse; an image filter, configured to filter the plurality of frames to generate a series of filtered images; an FPN estimator, configured to generate an FPN estimated signal by averaging the series of filtered images; a motion calculation circuit, configured to accumulate motion of the optical mouse; and an update regulator, configured to generate an accumulated distance according to the accumulated motion of the optical mouse, and configured to compare the accumulated distance with a threshold and generate an update signal to the FPN estimator when the accumulated motion is greater than the threshold. The FPN estimator generates the FPN estimated signal when the update signal is received, and the FPN estimator sends a reset signal to the update regulator after the FPN estimation is performed, wherein the reset signal is for resetting the accumulated distance to zero.

Accumulating motion of the optical mouse comprises: accumulating motion of the optical mouse in the x axis; accumulating motion of the optical mouse in the y axis; and calculating a hypotenuse of the accumulated motion in the x axis and the accumulated motion in the y axis to generate the accumulated distance.

These and other objectives of the present invention will no doubt become obvious to those of ordinary skill in the art after reading the following detailed description of the preferred embodiment that is illustrated in the various figures and drawings.

DETAILED DESCRIPTION

Performing FPN estimation and subtracting the estimated FPN from the raw image is a useful technique for reducing noise in images captured by an optical mouse. As detailed above, however, this technique becomes less effective when the mouse is stationary or hardly moving. It is therefore an objective of the present invention to limit the FPN estimation to only be performed when the mouse has moved over a particular distance. This is achieved by adding an update regulator which works in tandem with a correlator and a motion calculation circuit contained within the optical mouse. By using the update regulator to accumulate changes in motion of the mouse and then comparing this accumulated motion with a threshold, FPN estimation can be limited to only be performed when accumulated motion of the mouse exceeds the threshold.

Figure 1:
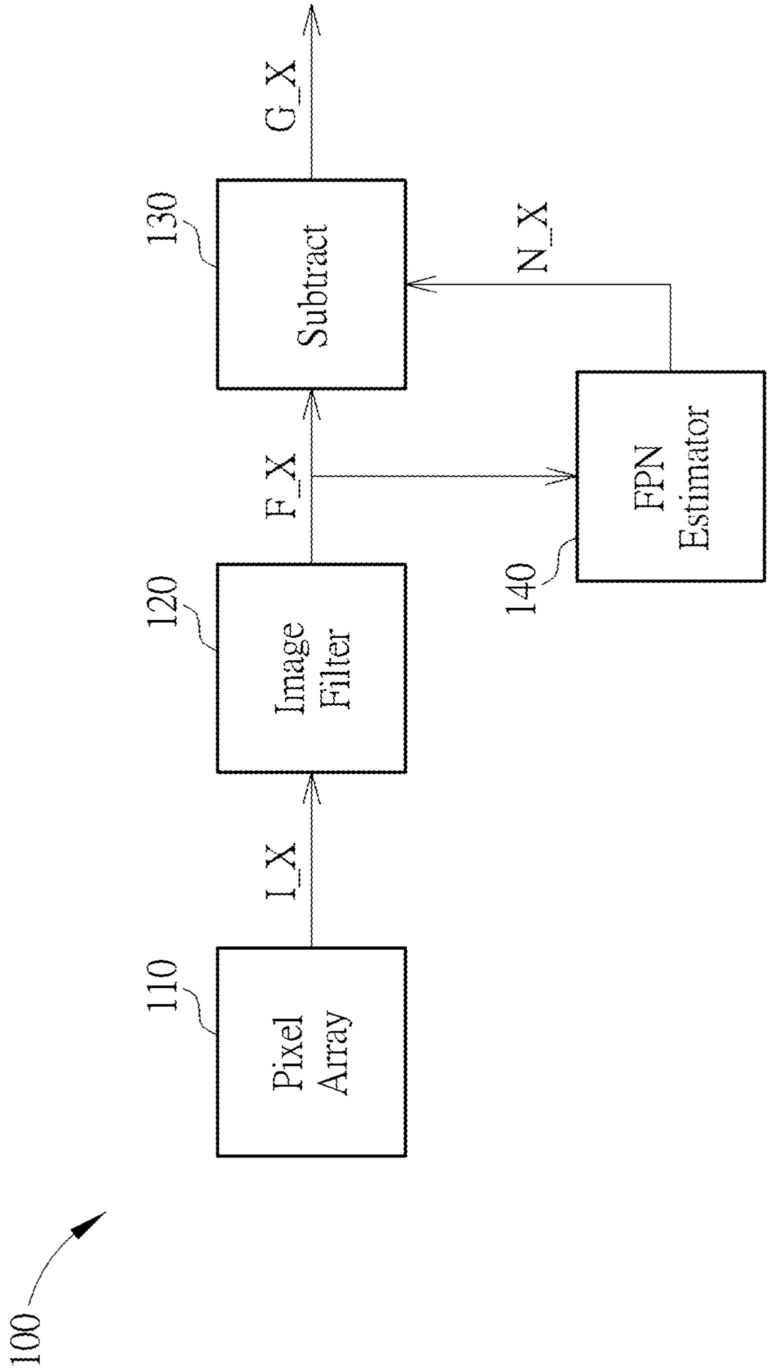
FIG. 1 is a diagram of a related art optical mouse.
Figure 2:
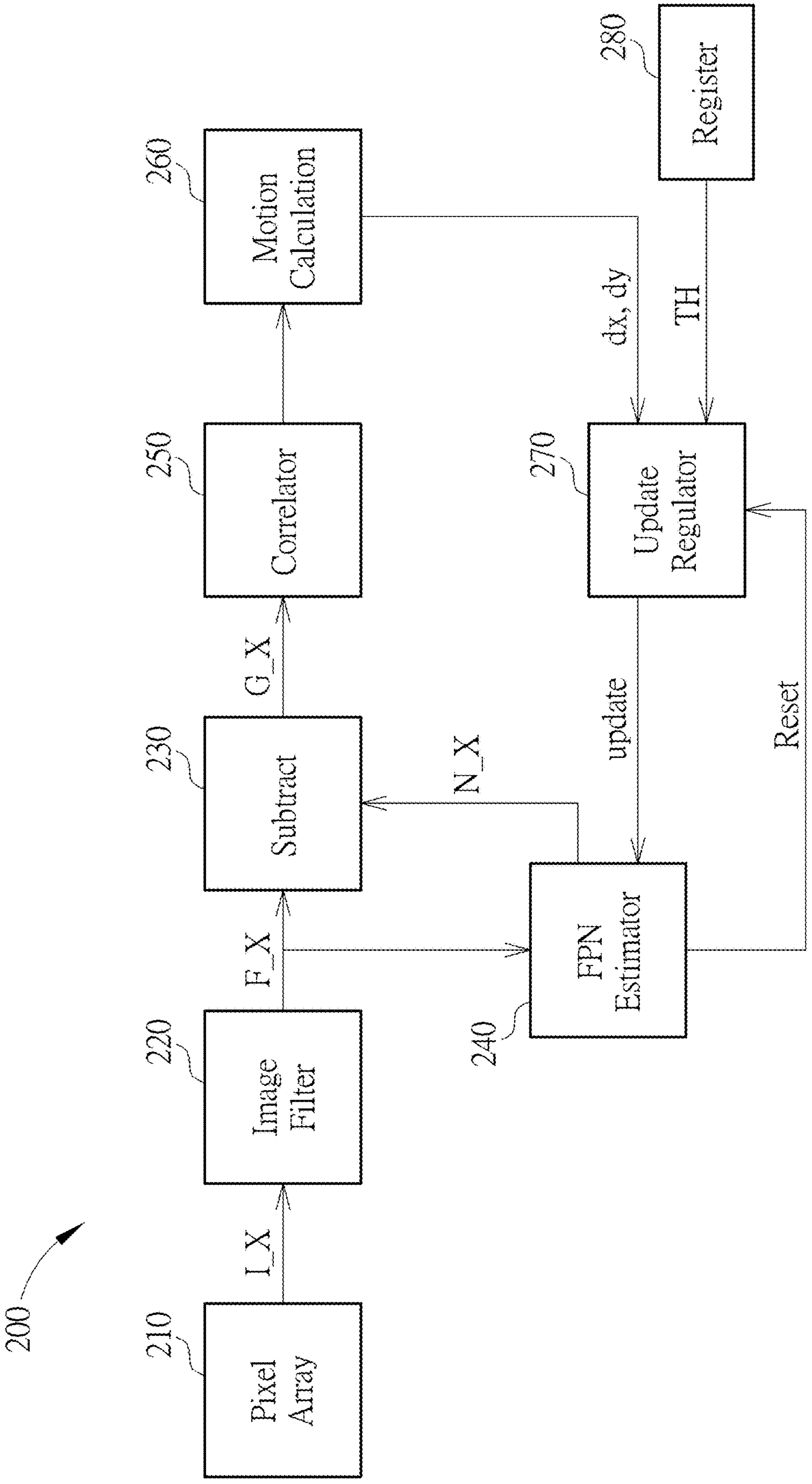
FIG. 2 is a diagram of an optical mouse according to an exemplary embodiment of the present invention.

Refer to FIG. 2, which is a diagram of an optical mouse 200 according to an exemplary embodiment of the present invention. As shown in the diagram, the optical mouse 200 comprises: a pixel array 210 for generating a series of images I_x; an image filter 220, for receiving I_x and generating a filtered signal F_x; a subtract circuit 230, for receiving F_x and subtracting an FPN estimate N_x from the filtered signal F_x to generate an output G_x; a correlator 250, for comparing the output G_x of two successive images; a motion calculation circuit 260, for generating motion of the mouse 200 according to the correlation of two successive images; an FPN estimator 240 coupled to the image filter 220, for receiving the filtered signal F_x and averaging the images to generate an FPN estimate N_x; an update regulator 270 for receiving delta signals (dx, dy) from the motion calculation circuit 260 and a reset signal 'Reset' from the FPN estimator 240, determining an accumulated motion of the mouse according to the delta signals upon receiving the 'Reset' signal, and generating an update signal 'update' to the FPN estimator 240 according to a comparison between the delta signals and a threshold signal TH; and a register 280, coupled to the update regulator 270, for inputting the threshold signal TH to the update regulator 270.

The threshold signal TH can be dynamically changed, either according to system or user requirements, wherein the threshold signal TH will correspond to accumulated motion of the mouse 200 in one or both axes, and more specifically will correspond to a specific number of pixels in one or both axes, or a specific number of pixels of a hypotenuse of the two axes. In the following, the description will use a threshold TH being two pixels, but one skilled in the art will appreciate that this threshold is adaptive, and can be set according to user or device requirements. The threshold TH is ideally at least equal to one pixel.

The update regulator 270 regularly receives the delta signals dx, dy from the motion calculation circuit 260 and accumulates both delta signals to determine accumulated motion of the mouse 200. When the mouse 200 has been determined to have moved over two pixels according to the delta signals (i.e. a hypotenuse of accumulated dx AND accumulated dy>=2), the update regulator 270 will output the update signal 'update' to the FPN estimator 240. This enables the FPN estimator 240 to average historical F_x images for generating the FPN estimate N_x, which will be output to the subtract circuit 230. The subtract circuit 230 can then subtract the FPN estimate N_x from the filtered image F_x. At the same time, the FPN estimator 240 will output a reset signal 'Reset' to the update regulator 270 to reset the accumulated motion back to zero.

This technique of regulating updates to the FPN estimator 240 means that the issue of features being incorporated into N_x can be minimized. This is because the features will only be sampled once for a given pixel location in N_x; therefore, the averaging process will not average out the features to the point that they cannot be distinguished from the FPN.

In the above description, the update regulator 270 will enable the FPN estimator 240 once the accumulated motion of a hypotenuse of the delta signals is greater than two pixels. Note that the present invention can also use accumulated motion in only one of the x and y axes as a basis for enabling the FPN estimator 240, i.e. dx=2 AND/OR dy=2. The update regulation procedure can be summarized as follows:

1) If the frame is a first frame or if an update was asserted in the previous frame, reset the accumulators; mot_x=0, mot_y=0
2) Accumulate dx; mot_x+=dx
3) Accumulate dy; mot_y+=dy
4) Calculate distance; dist=hypotenuse (mot_x, mot_y)
5) If distance>threshold, assert update
6) Return to Step 1)

Note that step 4) will result in a threshold TH covering a circular area, but can be adjusted to be a square area. No matter the resultant shape of the threshold TH, only movement outside of the threshold range will result in FPN estimation being performed.

Figure 3A:
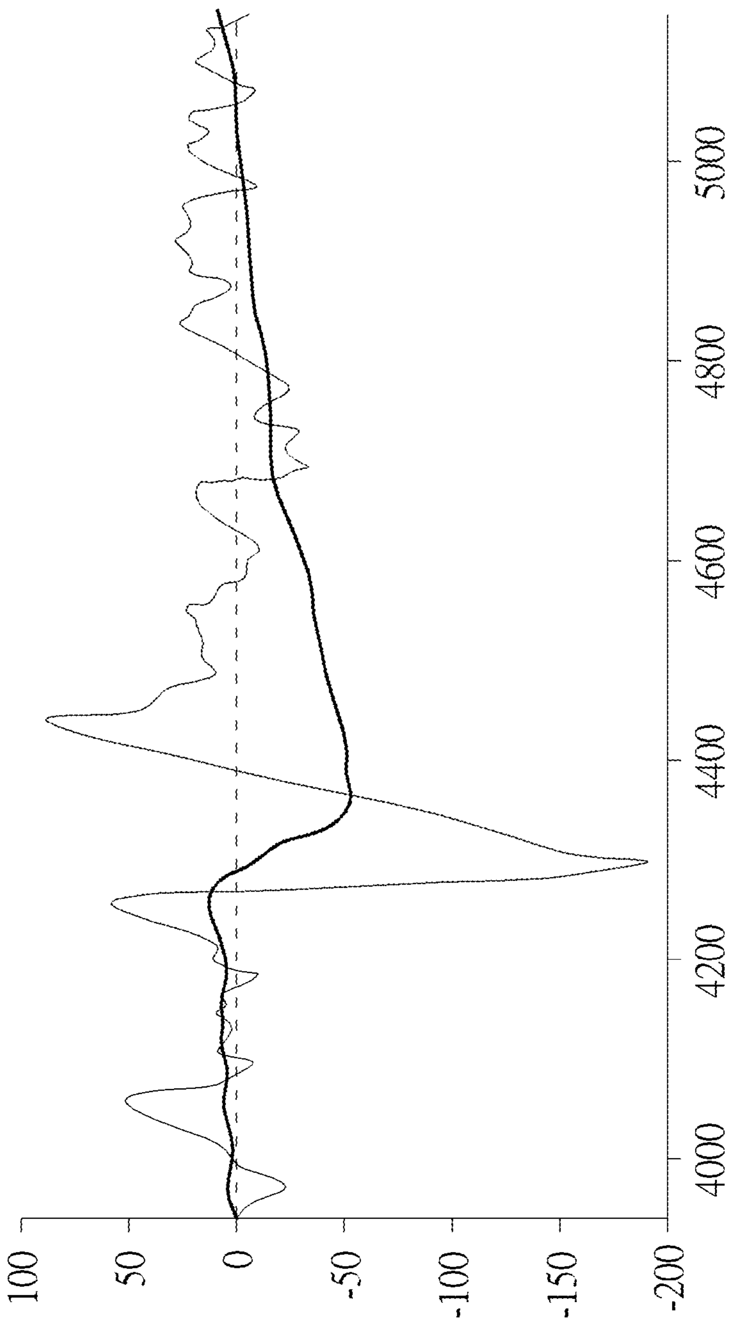
FIG. 3A is a graph illustrating FPN estimation for a series of frames captured by the optical mouse shown in FIG. 1.

Refer to FIG. 3A, which is a graph illustrating a method of FPN estimation for a pixel of interest (POI) according to the related art. As shown in the diagram, F_x is plotted for a particular POI, and N_x is calculated for the same POI, wherein the calculation is performed each frame. The dotted line illustrates the average or ideal FPN estimate, and can only be computed off-line. At frame index 4380, a feature will cross the POI, which results in F_poi undergoing a large deviation. As N_x is updated each frame, N_poi will 'follow' F_poi, and therefore will deviate significantly from the ideal value.

Figure 3B:
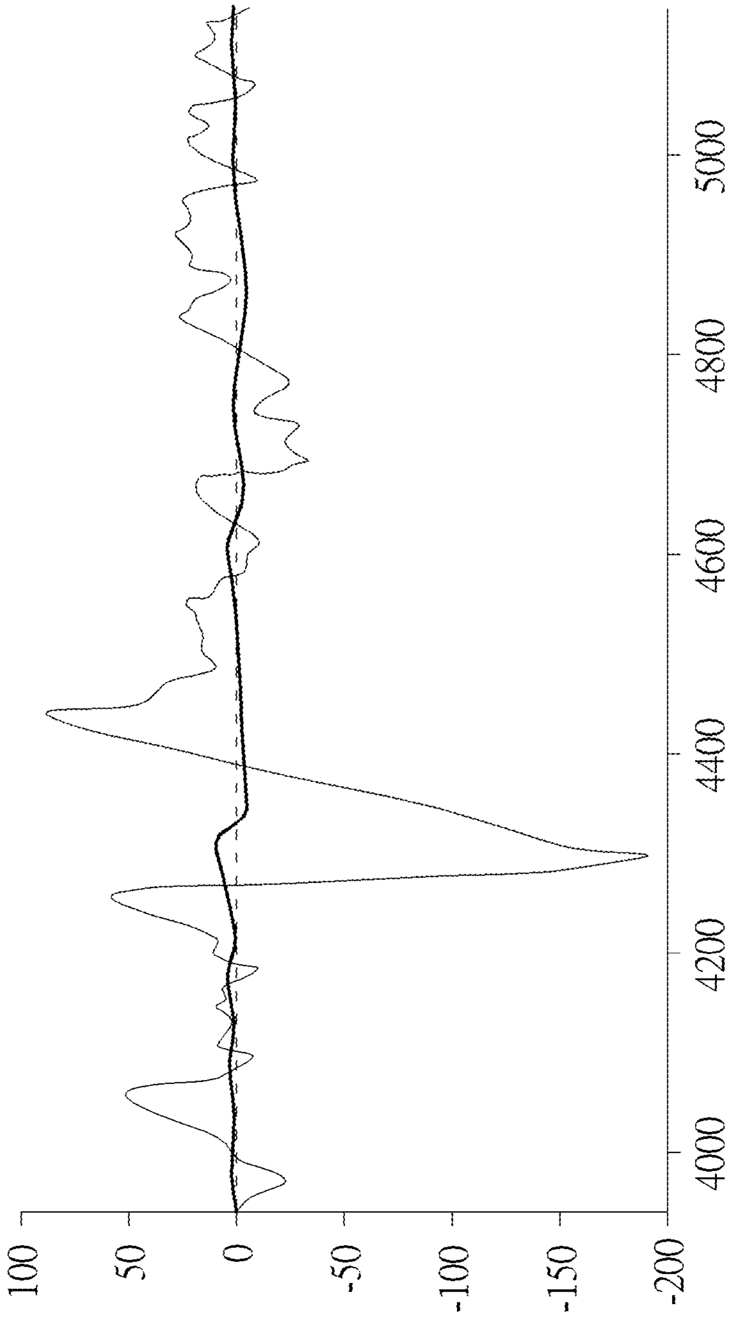
FIG. 3B is a graph illustrating FPN estimation for a series of frames captured by the optical mouse shown in FIG. 2.

Refer to FIG. 3B, which is a graph illustrating a method of FPN estimation for a pixel of interest POI according to an exemplary embodiment of the present invention, wherein an update regulator only enables FPN estimation when accumulated motion of the mouse is greater than a threshold. As shown in the diagram, F_poi undergoes the strong deviation at frame 4380; however, as N_poi is not updated every frame, it will only deviate slightly from the average/ideal FPN estimate, thereby achieving the objective of reducing noise without reducing the correlation sensitivity.

Figure 4:
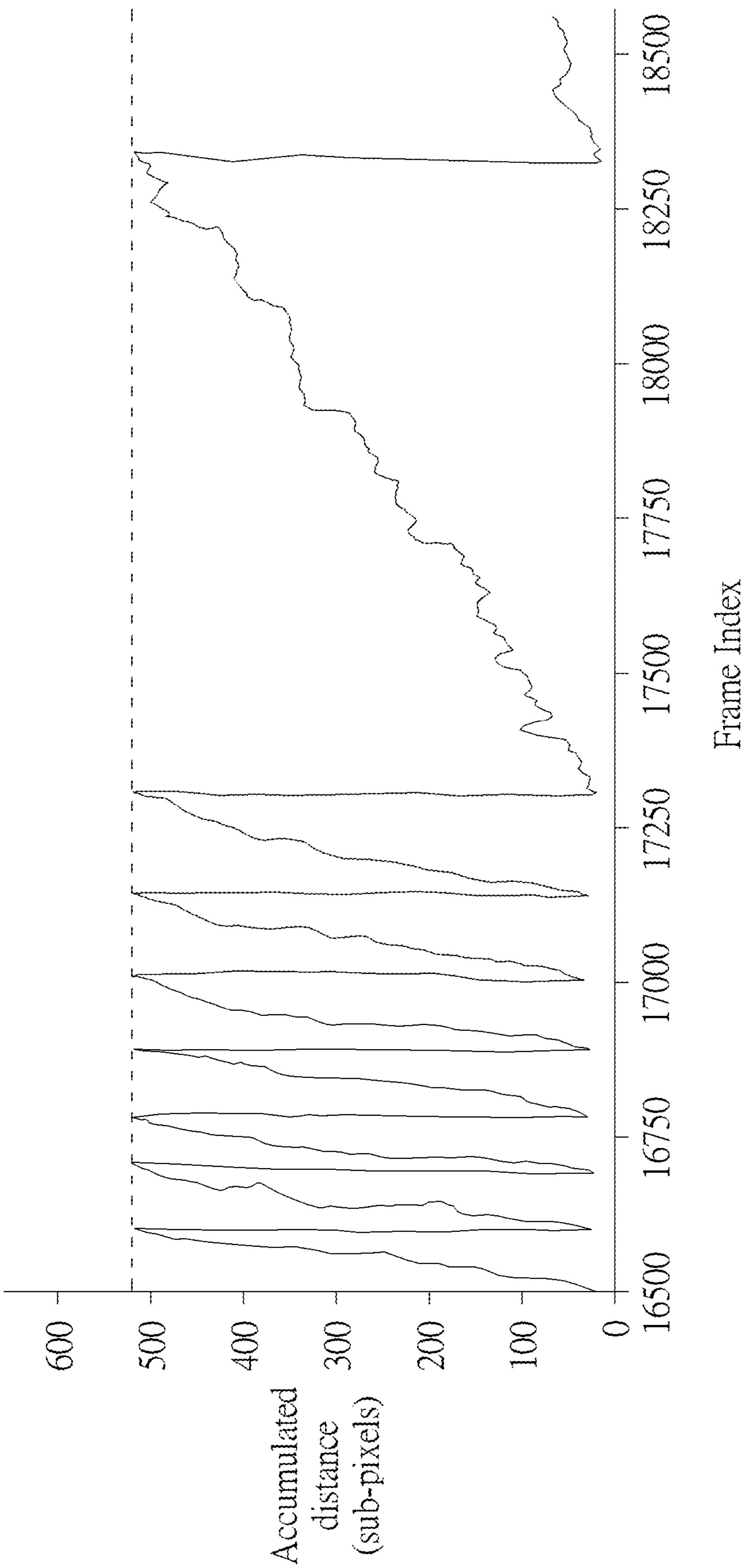
FIG. 4 is a graph illustrating accumulated distance over a series of frames captured by the optical mouse shown in FIG. 2.

FIG. 4 is a graph illustrating accumulated distance over a series of frames captured by the optical mouse 200 shown in FIG. 2. Between frames 16,500 and 16,750, the mouse is moving over a larger distance, and therefore the accumulated distance regularly reaches 512 sub-pixels (wherein 1 pixel=256 sub-pixels). Each time the accumulated distance reaches this threshold TH, N_poi will be updated, and the accumulated distance will be reset to zero. After frame 16,750, the mouse starts to slow down such that the accumulated distance takes longer to reach 512 sub-pixels and the accumulated distance is reset less during this time. At frame 17,250 the mouse is almost stationary, and only moves a very small amount such that the accumulated distance threshold TH is only reached at frame 18,250, at which point the accumulated distance is reset. After frame 18,250 the mouse again becomes almost stationary.

In summary, rather than performing FPN estimation for each frame, the present invention only performs FPN estimation when motion of the mouse has exceeded a certain threshold, i.e. rather than performing FPN estimation according to time, FPN estimation is performed according to distance. This allows more accurate tracking of features with reduced noise in the images, and further has the advantage of reducing power consumption as FPN estimation and subtraction is not performed for every frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing fixed-pattern noise (FPN) estimation in an optical mouse, the method comprising:

capturing a series of images to generate a plurality of frames;

accumulating motion of the optical mouse according to correlation of two successive images of the plurality of frames to generate an accumulated distance;

comparing the accumulated distance to a threshold;

when the accumulated distance is greater than the threshold, enabling FPN estimation of the plurality of frames; and resetting the accumulated distance to zero after the FPN estimation is performed.

2. The method of claim 1, wherein the step of enabling FPN estimation comprises:

filtering each frame of the plurality of frames to generate a series of filtered images;

averaging the filtered images to generate an FPN estimated signal; and subtracting the FPN estimated signal from each of the filtered images to generate a series of resultant images;

wherein the correlation of two successive images is correlation of two successive resultant images.

3. The method of claim 1, wherein the accumulated motion of the mouse is in an x axis.

4. The method of claim 1, wherein the accumulated motion of the mouse is in a y axis.

5. The method of claim 1, wherein the accumulated motion of the mouse is in an x axis and a y axis.

6. The method of claim 5, wherein the step of generating an accumulated distance of the optical mouse comprises:

accumulating motion of the optical mouse in the x axis;

accumulating motion of the optical mouse in the y axis; and calculating a hypotenuse of the accumulated motion in the x axis and the accumulated motion in the y axis to generate the accumulated distance.

7. The method of claim 1, wherein the threshold is set according to user requirements.

8. The method of claim 1, wherein the threshold is set automatically by the optical mouse.

9. The method of claim 1, wherein the threshold is equal to two pixels.

10. An optical mouse, configured to perform fixed-pattern noise (FPN) estimation, the optical mouse comprising:

a pixel array circuit, configured to generate a plurality of frames corresponding to a series of images captured by the optical mouse;

an image filter, configured to filter the plurality of frames to generate a series of filtered images;

an FPN estimator, configured to generate an FPN estimated signal by averaging the series of filtered images in response to an update signal;

a correlator, configured to determine correlation of two successive filtered images;

a motion calculation circuit, configured to accumulate motion of the optical mouse according to the correlation; and an update regulator, configured to generate an accumulated distance according to the accumulated motion of the optical mouse, and configured to compare the accumulated distance with a threshold and generate the update signal to the FPN estimator when the accumulated motion is greater than the threshold;

wherein the FPN estimator generates the FPN estimated signal when the update signal is received, and the FPN estimator sends a reset signal to the update regulator after the FPN estimation is performed, the reset signal for resetting the accumulated distance to zero.

11. The optical mouse of claim 10, wherein the accumulated motion of the mouse is in an x axis.

12. The optical mouse of claim 10, wherein the accumulated motion of the mouse is in a y axis.

13. The optical mouse of claim 10, wherein the accumulated motion of the mouse is in an x axis and a y axis.

14. The optical mouse of claim 13, wherein the update regulator generates the accumulated distance by calculating a hypotenuse of the accumulated motion in the x axis and the accumulated motion in the y axis.

15. The optical mouse of claim 10, wherein the threshold is set according to user requirements.

16. The optical mouse of claim 10, wherein the threshold is set automatically by the optical mouse.

17. The optical mouse of claim 10, wherein the threshold is equal to two pixels.

18. The optical mouse of claim 10, further comprising:

a subtractor, configured to generate a series of resultant images by subtracting the FPN estimated signal from each image of the series of filtered images;

wherein the correlator is configured to determine correlation of two successive filtered images.

* * * * *